United States Patent
Huang et al.

(10) Patent No.: US 10,559,962 B2
(45) Date of Patent: Feb. 11, 2020

(54) POWER-OUTPUTTING MANAGEMENT METHOD FOR POWER-SUPPLYING APPARATUS

(71) Applicant: AIC INC., Taoyuan (TW)

(72) Inventors: Jen-Yuan Huang, Taoyuan (TW);
Chun-Kai Liou, Taoyuan (TW);
Yi-Rong Yang, Taoyuan (TW);
Chin-Yu Yeh, Taoyuan (TW)

(73) Assignee: AIC INC., Taoyuan (TW)

( * ) Notice: Subject to any disclaimer, the term of this patent is extended or adjusted under 35 U.S.C. 154(b) by 196 days.

(21) Appl. No.: 15/863,863

(22) Filed: Jan. 6, 2018

(65) Prior Publication Data
US 2019/0214829 A1    Jul. 11, 2019

(51) Int. Cl.
*H02J 4/00*    (2006.01)

(52) U.S. Cl.
CPC .................... *H02J 4/00* (2013.01)

(58) Field of Classification Search
CPC .......................................................... H02J 4/00
See application file for complete search history.

(56) References Cited

U.S. PATENT DOCUMENTS

| | | | |
|---|---|---|---|
| 3,894,244 A * | 7/1975 | Hill | H02J 3/14 307/16 |
| 7,170,194 B2 * | 1/2007 | Korcharz | H02J 1/10 307/21 |
| 7,312,962 B1 * | 12/2007 | Zansky | H02H 3/087 361/18 |
| 7,528,503 B2 * | 5/2009 | Rognli | G06Q 30/0207 307/62 |
| 7,539,881 B2 * | 5/2009 | Shaw | G06F 1/3203 713/300 |
| 7,906,871 B2 * | 3/2011 | Freeman | G06F 1/263 307/43 |
| 8,552,588 B2 * | 10/2013 | Yang | H02J 7/0068 307/54 |
| 9,292,064 B2 * | 3/2016 | Grout | G06F 1/26 |

(Continued)

FOREIGN PATENT DOCUMENTS

CN    105359057 A    2/2016

OTHER PUBLICATIONS

Office Action dated Sep. 11, 2018 of the corresponding Taiwan patent application.

*Primary Examiner* — Pinping Sun
(74) *Attorney, Agent, or Firm* — Chun-Ming Shih; HDLS IPR Services

(57) ABSTRACT

A power-outputting management method includes following steps. When a plurality of power-supplying apparatuses are in a working interval, if an output power ratio of the power-supplying apparatus in a working status is less than an output power ratio standard, at least one of the power-supplying apparatuses in the working status is turned off, so that the output power ratio of the power-supplying apparatus in the working status increases and meets the output power ratio standard. When the power-supplying apparatuses are in the working interval, if the output power ratio of the power-supplying apparatus in the working status meets the output power ratio standard, a power capping of the power-supplying apparatuses is set based on an actual power consumption of an electronic apparatus.

10 Claims, 2 Drawing Sheets

(56) References Cited

U.S. PATENT DOCUMENTS

| | | | |
|---|---|---|---|
| 9,397,520 B2* | 7/2016 | Redpath | H02J 9/06 |
| 10,164,463 B2* | 12/2018 | Vogman | G06F 1/263 |
| 2005/0028017 A1* | 2/2005 | Janakiraman | G06F 1/263 |
| | | | 713/340 |
| 2009/0167089 A1* | 7/2009 | Dishman | H02J 1/10 |
| | | | 307/64 |
| 2009/0217060 A1* | 8/2009 | Tsuchiya | G06F 1/3203 |
| | | | 713/300 |
| 2014/0157013 A1* | 6/2014 | Ei-Essawy | H05K 7/1492 |
| | | | 713/300 |
| 2015/0092462 A1* | 4/2015 | Ohori | H02M 7/44 |
| | | | 363/71 |

\* cited by examiner

POWER-OUTPUTTING MANAGEMENT METHOD FOR POWER-SUPPLYING APPARATUS

BACKGROUND OF THE INVENTION

Field of the Invention

The present invention relates to a power-outputting management method, and especially relates to a power-outputting management method for power-supplying apparatuses.

Description of the Related Art

The related art power-supplying apparatus supplies power to the electronic apparatus to drive the electronic apparatus, so that the related art power-supplying apparatus is very important. The related art power-supplying apparatus is used widely. For example, a lot of the related art power-supplying apparatuses are arranged in the large data center to supply power to a plurality of servers.

Currently, the power-outputting method of a plurality of the related art power-supplying apparatuses connected to each other to supply power to a plurality of servers is that, the total power requirement of the servers divided by the quantity of the related art power-supplying apparatuses is the actual output power of each of the related art power-supplying apparatuses. For example, if there are 5 servers and 10 related art power-supplying apparatuses and the power requirement of each of the servers is 500 watts at that time, the total power requirement of the servers is 2500 watts (500*5=2500). Therefore, each of the related art power-supplying apparatuses will output 250 watts (2500/10=250). Although this method is simple, there is the problem of energy wastage, and this would be described as following.

The actual output power of the related art power-supplying apparatus divided by the maximal output power of the related art power-supplying apparatus (namely, the maximal power that the related art power-supplying apparatus can output) is equal to the output power ratio of the related art power-supplying apparatus. Continuing from the example mentioned above, if the maximal output power of the related art power-supplying apparatus is 1000 watts (namely, the maximal power that the related art power-supplying apparatus mentioned above can output is 1000 watts), the output power ratio of the related art power-supplying apparatus is 25% (250/1000=25%) at that time.

Moreover, the power conversion efficiency of the related art power-supplying apparatus is equal to the actual output power of the related art power-supplying apparatus divided by the energy used by the related art power-supplying apparatus. If the power conversion efficiency is higher, the power conversion efficiency is better. Higher power conversion efficiency means that inefficient power consumption is lower. For example, if the actual output power of the related art power-supplying apparatus is 900 watts while the energy used by the related art power-supplying apparatus is 1000 watts, then the power conversion efficiency of the related art power-supplying apparatus is equal to 90% (900/1000=90%), so that the inefficient power consumption is 100 watts (1000−900=100). For another example, if the actual output power of the related art power-supplying apparatus is 950 watts while the energy used by the related art power-supplying apparatus is 1000 watts, then the power conversion efficiency of the related art power-supplying apparatus is equal to 95% (900/1000=95%), so that the inefficient power consumption is 50 watts (1000−950=50).

The related art power-supplying apparatus mentioned above has different power conversion efficiency at different output power ratio. Continuing from the example mentioned above, if the output power ratio of the related art power-supplying apparatus mentioned above is 25% (or 20%~30%), 50% (or 45%~55%) and 95% (or 90%~100%), then the power conversion efficiency is 90%, 95% and 90% respectively. Apparently, the related art power-supplying apparatus mentioned above working at the output power ratio 50% (or 45%~55%) is the best, which has the power conversion efficiency 95%. However, the example mentioned above uses the simple method to evenly divide the total power requirement, wherein the simple method simply renders the output power ratio of each of the related art power-supplying apparatuses is 25%, which has the power conversion efficiency only 90%.

SUMMARY OF THE INVENTION

In order to solve the above-mentioned problems, an object of the present invention is to provide a power-outputting management method for power-supplying apparatuses.

In order to achieve the object of the present invention mentioned above, the power-outputting management method of the present invention is applied to a plurality of the power-supplying apparatuses and at least one electronic apparatus. The power-supplying apparatuses are configured to supply power to the electronic apparatus. The power-outputting management method comprises following steps. When the power-supplying apparatuses are in a working interval, if an output power ratio of the power-supplying apparatus in a working status is less than an output power ratio standard, at least one of the power-supplying apparatuses in the working status is turned off, so that the output power ratio of the power-supplying apparatus in the working status increases and meets the output power ratio standard (namely, turn off at least one of the power-supplying apparatuses in the working status to increase the output power ratio of the power-supplying apparatus in the working status to meet the output power ratio standard if the power-supplying apparatuses are in the working interval and the output power ratio of the power-supplying apparatus in the working status is less than the output power ratio standard). When the power-supplying apparatuses are in the working interval, if the output power ratio of the power-supplying apparatus in the working status meets the output power ratio standard, a power capping of the power-supplying apparatuses is set based on an actual power consumption of the electronic apparatus (namely, set the power capping of the power-supplying apparatuses based on the actual power consumption of the electronic apparatus if the power-supplying apparatuses are in the working interval and the output power ratio of the power-supplying apparatus in the working status meets the output power ratio standard).

Moreover, in an embodiment, in the power-outputting management method mentioned above, the output power ratio standard is 50%, or is between 45% and 55%.

Moreover, in an embodiment, the power-outputting management method mentioned above further comprises the following step. When the power-supplying apparatuses are in the working interval, if the output power ratio of the power-supplying apparatus in the working status is greater than the output power ratio standard, and if at least one of the power-supplying apparatuses is in a rest status, and if turning on the power-supplying apparatus in the rest status to cause the output power ratio of the power-supplying apparatus in the working status to meet the output power ratio standard is achievable, the power-supplying apparatus in the rest status is tuned on, so that the output power ratio of the power-supplying apparatus in the working status decreases and meets the output power ratio standard (namely, turn on the power-supplying apparatus in the rest status to decrease the output power ratio of the power-supplying apparatus in the working status to meet the output power ratio standard if the power-supplying apparatuses are in the working interval and the output power ratio of the power-supplying apparatus in the working status is greater than the output power ratio standard and at least one of the power-supplying apparatuses is in the rest status and turning on the power-supplying apparatus in the rest status to cause the output power ratio of the power-supplying apparatus in the working status to meet the output power ratio standard is achievable).

Moreover, in an embodiment, the power-outputting management method mentioned above further comprises the following step. When the power-supplying apparatuses are in the working interval, if the output power ratio of the power-supplying apparatus in the working status is greater than the output power ratio standard, and if at least one of the power-supplying apparatuses is in the rest status, and if turning on the power-supplying apparatus in the rest status to cause the output power ratio of the power-supplying apparatus in the working status to meet the output power ratio standard is unachievable, all of the power-supplying apparatuses are turned on, so that the output power ratio of the power-supplying apparatus in the working status decreases, and the power capping of the power-supplying apparatuses is set based on the actual power consumption of the electronic apparatus (namely, turn on all of the power-supplying apparatuses to decrease the output power ratio of the power-supplying apparatus in the working status and set the power capping of the power-supplying apparatuses based on the actual power consumption of the electronic apparatus if the power-supplying apparatuses are in the working interval and the output power ratio of the power-supplying apparatus in the working status is greater than the output power ratio standard and at least one of the power-supplying apparatuses is in the rest status and turning on the power-supplying apparatus in the rest status to cause the output power ratio of the power-supplying apparatus in the working status to meet the output power ratio standard is unachievable).

Moreover, in an embodiment, the power-outputting management method mentioned above further comprises the following step. When the power-supplying apparatuses are in the working interval, if the output power ratio of the power-supplying apparatus in the working status is greater than the output power ratio standard, and if all of the power-supplying apparatuses are in the working status, the power capping of the power-supplying apparatuses is set based on the actual power consumption of the electronic apparatus (namely, set the power capping of the power-supplying apparatuses based on the actual power consumption of the electronic apparatus if the power-supplying apparatuses are in the working interval and the output power ratio of the power-supplying apparatus in the working status is greater than the output power ratio standard and all of the power-supplying apparatuses are in the working status).

Moreover, in an embodiment, the power-outputting management method mentioned above further comprises the following step. When all of the power-supplying apparatuses boot for a first time to enter a booting interval, if the output power ratio of the power-supplying apparatus in the working status is less than the output power ratio standard, firstly the power capping of the power-supplying apparatuses is set based on the actual power consumption of the electronic apparatus, secondly at least one of the power-supplying apparatuses in the working status is turned off so that the output power ratio of the power-supplying apparatus in the working status increases and meets the output power ratio standard, and then the power-supplying apparatuses enter the working interval (namely, firstly set the power capping of the power-supplying apparatuses based on the actual power consumption of the electronic apparatus, secondly turn off at least one of the power-supplying apparatuses in the working status to increase the output power ratio of the power-supplying apparatus in the working status to meet the output power ratio standard, and then the power-supplying apparatuses enter the working interval, if all of the power-supplying apparatuses boot for the first time to enter the booting interval and the output power ratio of the power-supplying apparatus in the working status is less than the output power ratio standard).

Moreover, in an embodiment, the power-outputting management method mentioned above further comprises the following step. When all of the power-supplying apparatuses boot for the first time to enter the booting interval, if the output power ratio of the power-supplying apparatus in the working status is greater than or meets the output power ratio standard, firstly the power capping of the power-supplying apparatuses is set based on the actual power consumption of the electronic apparatus, and secondly the power-supplying apparatuses enter the working interval (namely, firstly set the power capping of the power-supplying apparatuses based on the actual power consumption of the electronic apparatus, and secondly the power-supplying apparatuses enter the working interval, if all of the power-supplying apparatuses boot for the first time to enter the booting interval and the output power ratio of the power-supplying apparatus in the working status is greater than or meets the output power ratio standard).

Moreover, in an embodiment, in the power-outputting management method mentioned above, the power capping of the power-supplying apparatuses is set to be greater than the actual power consumption of the electronic apparatus (namely, set the power capping of the power-supplying apparatuses to be greater than the actual power consumption of the electronic apparatus).

Moreover, in an embodiment, in the power-outputting management method mentioned above, the power capping of the power-supplying apparatuses is set to be 1.2 times of the actual power consumption of the electronic apparatus (namely, set the power capping of the power-supplying apparatuses to be 1.2 times of the actual power consumption of the electronic apparatus).

Moreover, in an embodiment, in the power-outputting management method mentioned above, if at least one of the power-supplying apparatuses is in the working status and at least one of the power-supplying apparatuses is in the rest status, the power-supplying apparatuses rest by turns to extend a service life (namely, the power-supplying apparatuses are configured to rest by turns to extend the service life if at least one of the power-supplying apparatuses is in the working status and at least one of the power-supplying apparatuses is in the rest status).

The advantage of the present invention is to control the power-supplying apparatus in the working status to work with the output power ratio having the optimal power conversion efficiency to decrease inefficient power consumption to save energy.

Please refer to the detailed descriptions and figures of the present invention mentioned below for further understanding the technology, method and effect of the present invention. The figures are only for references and descriptions, and the present invention is not limited by the figures.

DETAILED DESCRIPTION OF THE INVENTION

Figure 1:
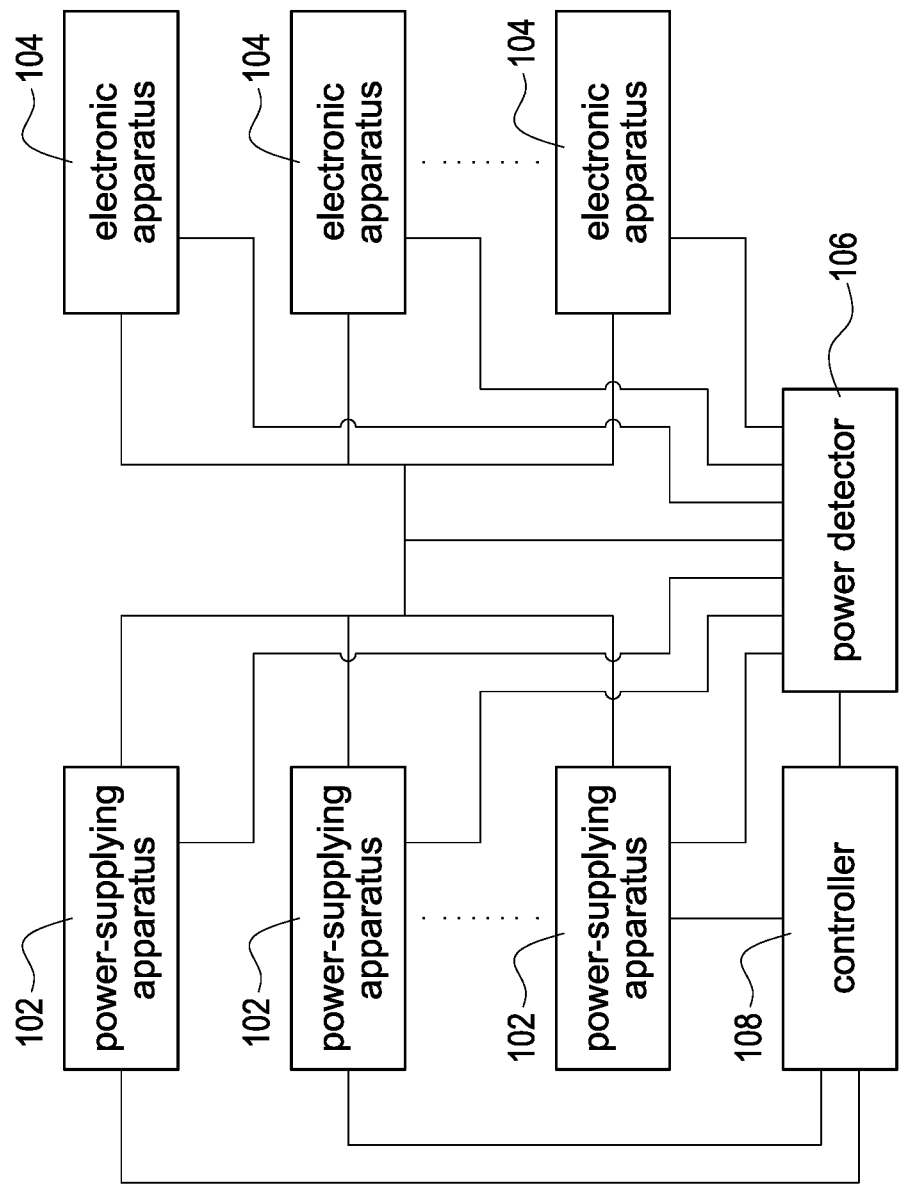
FIG. 1 shows a block diagram of an embodiment applied to the power-outputting management method of the present invention.

In the present disclosure, numerous specific details are provided, to provide a thorough understanding of embodiments of the invention. Persons of ordinary skill in the art will recognize, however, that the present invention can be practiced without one or more of the specific details. In other instances, well-known details are not shown or described to avoid obscuring aspects of the present invention. Please refer to following detailed description and figures for the technical content of the present invention:

FIG. 1 shows a block diagram of an embodiment applied to the power-outputting management method of the present invention. A power-outputting management method of the present invention is applied to a plurality of power-supplying apparatuses 102, a plurality of electronic apparatuses 104 (for example but not limited to servers), a power detector 106 and a controller 108. The components mentioned above are electrically connected to each other. The power-supplying apparatuses 102 supply power to the electronic apparatus 104. The power detector 106 detects an actual output power of each of the power-supplying apparatuses 102, an actual power consumption of each of the electronic apparatuses 104, a summation of the actual output powers of the power-supplying apparatuses 102, and a summation of the actual power consumptions of the electronic apparatuses 104, and then informs the controller 108 of the actual output power of each of the power-supplying apparatuses 102, the actual power consumption of each of the electronic apparatuses 104, the summation of the actual output powers of the power-supplying apparatuses 102, and the summation of the actual power consumptions of the electronic apparatuses 104, so that the controller 108 controls the power-supplying apparatuses 102 to work (namely, to be in a working status to supply power to the electronic apparatuses 104) or to rest (namely, to be in a rest status to cease supplying power to the electronic apparatuses 104).

A user (not shown in FIG. 1) or a data apparatus sends a data of a maximal output power of the power-supplying apparatus 102 (namely, a maximal power that the power-supplying apparatus 102 can output) to the controller 108, so that the controller 108 is aware of the maximal output power of the power-supplying apparatus 102. The controller 108 divides the actual output power of the power-supplying apparatus 102 by the maximal output power of the power-supplying apparatus 102 to obtain an output power ratio of the power-supplying apparatus 102. For example, the maximal output power of the power-supplying apparatus 102 is 1500 watts, the actual output power of the power-supplying apparatus 102 is 1500 watts, and then the output power ratio of the power-supplying apparatus 102 is 100%. For another example, the maximal output power of the power-supplying apparatus 102 is 1500 watts, the actual output power of the power-supplying apparatus 102 is 750 watts, and then the output power ratio of the power-supplying apparatus 102 is 50%.

A power conversion efficiency of the power-supplying apparatus 102 is equal to the actual output power of the power-supplying apparatus 102 divided by an energy used by the power-supplying apparatus 102. An inefficient power consumption of the power-supplying apparatus 102 is equal to the energy used by the power-supplying apparatus 102 minus the actual output power of the power-supplying apparatus 102. The power-supplying apparatus 102 has different power conversion efficiency at different output power ratio, and different brands of the power-supplying apparatuses 102 also have different results. For example, at output power ratio 20% (or 15%~25%), 50% (or 45%~55%) and 100% (or 95%~100%), the power conversion efficiency of a brand "A" of the power-supplying apparatus 102 is 88%, 92% and 88% respectively, while the power conversion efficiency of a brand "B" of the power-supplying apparatus 102 is 90%, 94% and 91% respectively. The user or the data apparatus sends the data of the power conversion efficiencies in accordance with the output power ratios of the power-supplying apparatuses 102 to the controller 108, so that the controller 108 is aware of the power conversion efficiencies in accordance with the output power ratios of the power-supplying apparatuses 102.

Take the brand "A" of the power-supplying apparatus 102 mentioned above as an example: if the summation of the actual power consumptions of the electronic apparatuses 104 is 15000 watts (namely, the requirement is 15000 watts) and the output power ratio 100% (namely, the power conversion efficiency 88%) is selected, a total energy used by the power-supplying apparatuses 102 has to be 17045.45 watts (15000/0.88 is about equal to 17045.45), and the inefficient power consumption is equal to 2045.45 watts (17045.45−15000=2045.45). However, if the output power ratio 50% (namely, the power conversion efficiency 92%) is selected, the total energy used by the power-supplying apparatuses 102 has to be 16304.35 watts (15000/0.92 is about equal to 16304.35), and the inefficient power consumption is equal to 1304.35 watts (16304.35−15000=1304.35). The difference between the two mentioned above is 741.1 watts (2045.45−1304.35=526.07). Namely, the inefficient power consumption of the output power ratio 50% can save 741.1 watts. In this example, an electricity consumption can save about 6492.03 degrees for one year (741.1 multiplied by 365 multiplied by 24 divided by 1000 is equal to 6492.03).

For another example, take the brand "A" of the power-supplying apparatus 102 mentioned above as an example: if the summation of the actual power consumptions of the electronic apparatuses 104 is 3000 watts (namely, the requirement is 3000 watts) and the output power ratio 20% (namely, the power conversion efficiency 88%) is selected, the total energy used by the power-supplying apparatuses 102 has to be 3409.09 watts (3000/0.88 is about equal to 3409.09), and the inefficient power consumption is equal to 409.09 watts (3409.09−3000=409.09). However, if the output power ratio 50% (namely, the power conversion efficiency 92%) is selected, the total energy used by the power-supplying apparatuses 102 has to be 3260.87 watts (3000/0.92 is about equal to 3260.87), and the inefficient power consumption is equal to 260.87 watts (3260.87−

3000=260.87). The difference between the two mentioned above is 148.22 watts (409.09−260.87=148.22). Namely, the inefficient power consumption of the output power ratio 50% can save 148.22 watts. In this example, the electricity consumption can save about 1298.41 degrees for one year (148.22 multiplied by 365 multiplied by 24 divided by 1000 is equal to 1298.41).

Take the brand "B" of the power-supplying apparatus 102 mentioned above as an example: if the summation of the actual power consumptions of the electronic apparatuses 104 is 15000 watts (namely, the requirement is 15000 watts) and the output power ratio 100% (namely, the power conversion efficiency 91%) is selected, the total energy used by the power-supplying apparatuses 102 has to be 16483.52 watts (15000/0.91 is about equal to 16483.52), and the inefficient power consumption is equal to 1483.52 watts (16483.52−15000=1483.52). However, if the output power ratio 50% (namely, the power conversion efficiency 94%) is selected, the total energy used by the power-supplying apparatuses 102 has to be 15957.45 watts (15000/0.94 is about equal to 15957.45), and the inefficient power consumption is equal to 957.45 watts (15957.45−15000=957.45). The difference between the two mentioned above is 526.07 watts (1483.52−957.45=526.07). Namely, the inefficient power consumption of the output power ratio 50% can save 526.07 watts. In this example, the electricity consumption can save about 4608.37 degrees for one year (526.07 multiplied by 365 multiplied by 24 divided by 1000 is equal to 4608.37).

For another example, take the brand "B" of the power-supplying apparatus 102 mentioned above as an example: if the summation of the actual power consumptions of the electronic apparatuses 104 is 3000 watts (namely, the requirement is 3000 watts) and the output power ratio 20% (namely, the power conversion efficiency 90%) is selected, the total energy used by the power-supplying apparatuses 102 has to be 3333.33 watts (3000/0.9 is about equal to 3333.33), and the inefficient power consumption is equal to 333.33 watts (3333.33−3000=333.33). However, if the output power ratio 50% (namely, the power conversion efficiency 94%) is selected, the total energy used by the power-supplying apparatuses 102 has to be 3191.49 watts (3000/0.94 is about equal to 3191.49), and the inefficient power consumption is equal to 191.49 watts (3191.49−3000=191.49). The difference between the two mentioned above is 141.84 watts (333.33−191.49=141.84). Namely, the inefficient power consumption of the output power ratio 50% can save 141.84 watts. In this example, the electricity consumption can save about 1242.52 degrees for one year (141.84 multiplied by 365 multiplied by 24 divided by 1000 is equal to 1242.52).

From the examples mentioned above, if the output power ratio having higher power conversion efficiency is selected, the inefficient power consumption can decrease more.

Figure 2:
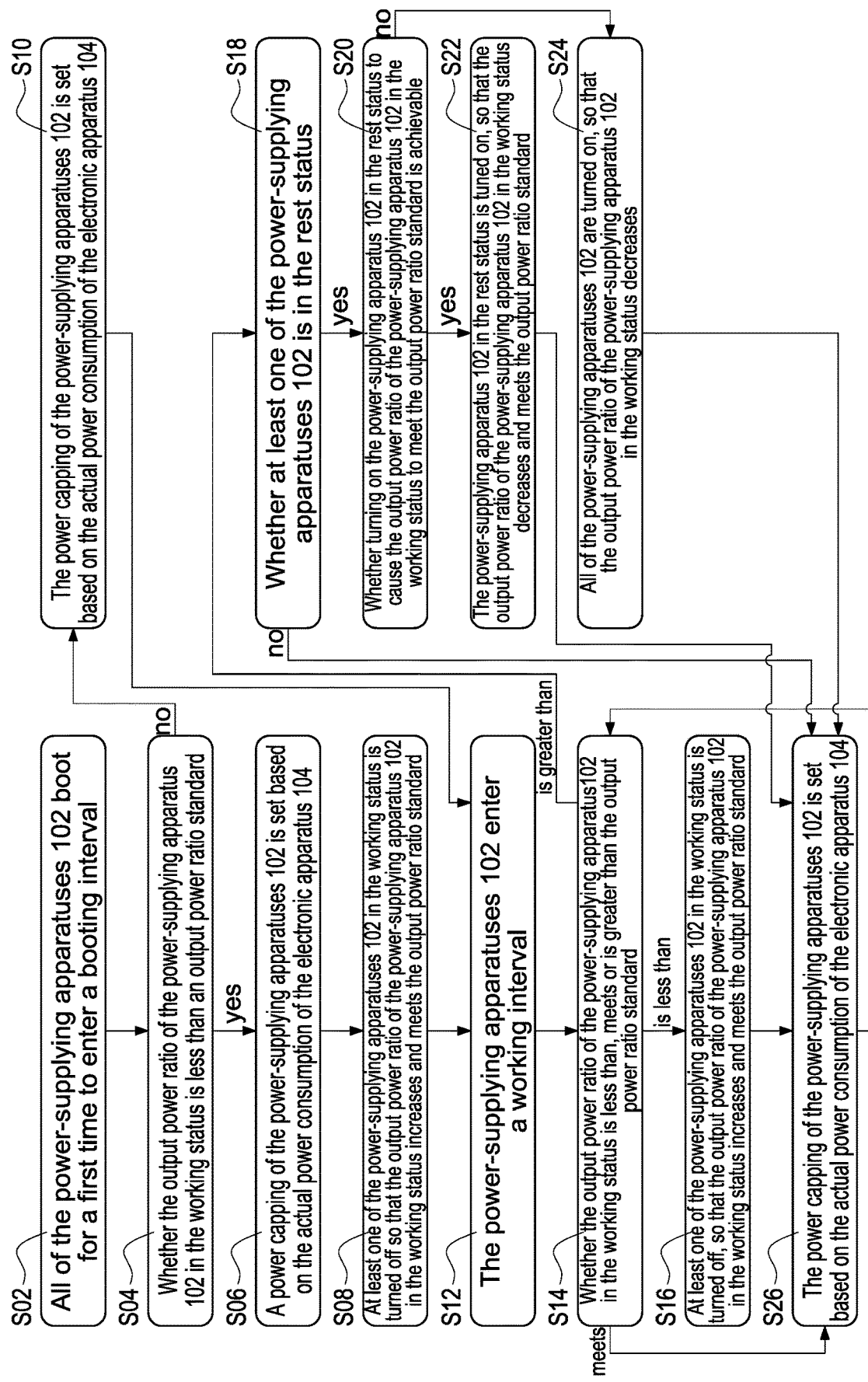
FIG. 2 shows a flow chart of an embodiment of the power-outputting management method of the present invention.

FIG. 2 shows a flow chart of an embodiment of the power-outputting management method of the present invention. Please refer to FIG. 1 at the same time. The power-outputting management method of the present invention comprises the following steps.

S02: All of the power-supplying apparatuses 102 boot for a first time to enter a booting interval. Then the power-outputting management method goes to a step S04.

S04: Whether the output power ratio of the power-supplying apparatus 102 in the working status is less than an output power ratio standard. If the output power ratio of the power-supplying apparatus 102 in the working status is less than the output power ratio standard, then the power-outputting management method goes to a step S06. If the output power ratio of the power-supplying apparatus 102 in the working status is not less than (namely, is greater than, or meets) the output power ratio standard, then the power-outputting management method goes to a step S10. Moreover, the user or the data apparatus sends the output power ratio standard to the controller 108, so that the controller 108 is aware of the output power ratio standard.

S06: A power capping of the power-supplying apparatuses 102 is set based on the actual power consumption of the electronic apparatus 104. Then the power-outputting management method goes to a step S08.

S08: At least one of the power-supplying apparatuses 102 in the working status is turned off so that the output power ratio of the power-supplying apparatus 102 in the working status increases and meets the output power ratio standard. Then the power-outputting management method goes to a step S12.

S10: The power capping of the power-supplying apparatuses 102 is set based on the actual power consumption of the electronic apparatus 104. Then the power-outputting management method goes to the step S12.

S12: The power-supplying apparatuses 102 enter a working interval. Then the power-outputting management method goes to a step S14.

S14: Whether the output power ratio of the power-supplying apparatus 102 in the working status is less than, meets or is greater than the output power ratio standard. If the output power ratio of the power-supplying apparatus 102 in the working status is less than the output power ratio standard, the power-outputting management method goes to a step S16. If the output power ratio of the power-supplying apparatus 102 in the working status meets the output power ratio standard, the power-outputting management method goes to a step S26. If the output power ratio of the power-supplying apparatus 102 in the working status is greater than the output power ratio standard, the power-outputting management method goes to a step S18.

S16: At least one of the power-supplying apparatuses 102 in the working status is turned off, so that the output power ratio of the power-supplying apparatus 102 in the working status increases and meets the output power ratio standard. Then the power-outputting management method goes to the step S26.

S18: Whether at least one of the power-supplying apparatuses 102 is in the rest status. If at least one of the power-supplying apparatuses 102 is in the rest status, the power-outputting management method goes to a step S20. If at least one of the power-supplying apparatuses 102 being in the rest status is not true (namely, all of the power-supplying apparatuses 102 are in the working status), the power-outputting management method goes to the step S26.

S20: Whether turning on the power-supplying apparatus 102 in the rest status to cause the output power ratio of the power-supplying apparatus 102 in the working status to meet the output power ratio standard is achievable. If turning on the power-supplying apparatus 102 in the rest status to cause the output power ratio of the power-supplying apparatus 102 in the working status to meet the output power ratio standard is achievable, the power-outputting management method goes to a step S22. If turning on the power-supplying apparatus 102 in the rest status to cause the output power ratio of the power-supplying apparatus 102 in the working status to meet the output power ratio standard is unachievable (namely, cannot achieve, meet or very close anyhow), the power-outputting management method goes to a step S24.

S22: The power-supplying apparatus 102 in the rest status is tuned on, so that the output power ratio of the power-supplying apparatus 102 in the working status decreases and meets the output power ratio standard. Then the power-outputting management method goes to the step S26.

S24: All of the power-supplying apparatuses 102 are turned on, so that the output power ratio of the power-supplying apparatus 102 in the working status decreases. Then the power-outputting management method goes to the step S26.

S26: The power capping of the power-supplying apparatuses 102 is set based on the actual power consumption of the electronic apparatus 104. Then the power-outputting management method returns to the step S14.

The contents mentioned above can be also described as following: When all of the power-supplying apparatuses 102 boot for the first time to enter the booting interval, if the output power ratio of the power-supplying apparatus 102 in the working status is less than the output power ratio standard (compared by the controller 108), firstly the power capping of the power-supplying apparatuses 102 is set by the controller 108 based on the actual power consumption of the electronic apparatus 104, secondly at least one of the power-supplying apparatuses 102 in the working status is turned off by the controller 108 so that the output power ratio of the power-supplying apparatus 102 in the working status increases and meets the output power ratio standard (compared by the controller 108), and then the power-supplying apparatuses 102 enter the working interval.

The purpose that the power capping of the power-supplying apparatuses 102 is set by the controller 108 based on the actual power consumption of the electronic apparatus 104 is to avoid the actual power consumption of the electronic apparatus 104 exceeding the power capping, so that the power capping of the power-supplying apparatuses 102 is set by the controller 108 and is greater than the actual power consumption of the electronic apparatus 104. For example, the power capping of the power-supplying apparatuses 102 is set by the controller 108 and is 1.2 times of the actual power consumption of the electronic apparatus 104.

For example, assuming that the maximal output power of the power-supplying apparatus 102 is 1500 watts, the output power ratio standard is set to be 50% (or 45%~55%) (namely, the output power ratio standard 50% (or 45%~55%) has the optimal power conversion efficiency), and there are 10 power-supplying apparatuses 102, then when all of the power-supplying apparatuses 102 boot for the first time to enter the booting interval, the power detector 106 detects the summation of the actual power consumptions of the electronic apparatuses 104. For example, the summation of the actual power consumptions is 5000 watts. At this time, each of the power-supplying apparatuses 102 will be responsible for outputting 500 watts (5000/10=500) computationally, so that the output power ratio is 33.33% (500/1500 is about equal to 33.33%), which is less than the output power ratio standard 50% (or 45%~55%). Then, firstly the controller 108 sets the power capping of the power-supplying apparatuses 102 to be 6000 watts (assuming the power capping is set to be 1.2 times of the summation of the actual power consumptions of the electronic apparatuses 104). Secondly the controller 108 calculates to know that 7 of the electronic apparatuses 104 have to be turned on (1500*50%=750, 5000/750 is about equal to 6.67, so the integer 7 which is the integer nearest to 6.67 is selected) and 3 of the electronic apparatuses 104 have to be turned off to meet (or to be nearest to) the output power ratio standard. At this time, each of the power-supplying apparatuses 102 will be responsible for outputting about 714.29 watts (5000/7 is about equal to 714.29), so that the output power ratio is 47.62% (714.29/1500 is about equal to 47.62%), which meets the output power ratio standard 45%~55%, or is near the output power ratio standard 50%. Turning on 7 of the electronic apparatuses 104 will obtain that a summation of the maximal output powers is 10500 watts (1500*7=10500). Then the power-supplying apparatuses 102 enter the working interval.

When all of the power-supplying apparatuses 102 boot for the first time to enter the booting interval, if the output power ratio of the power-supplying apparatus 102 in the working status is greater than or meets the output power ratio standard (compared by the controller 108), firstly the power capping of the power-supplying apparatuses 102 is set by the controller 108 based on the actual power consumption of the electronic apparatus 104, and secondly the power-supplying apparatuses 102 enters the working interval. In another embodiment of the present invention, when all of the power-supplying apparatuses 102 boot for the first time to enter the booting interval, if the output power ratio of the power-supplying apparatus 102 in the working status is greater than or meets the output power ratio standard (compared by the controller 108), the power detector 106 detects and the controller 108 calculates the output power ratio of the power-supplying apparatus 102 in the working status until the output power ratio of the power-supplying apparatus 102 in the working status is less than the output power ratio standard.

For example, assuming that the maximal output power of the power-supplying apparatus 102 is 1500 watts, the output power ratio standard is set to be 50% (or 45%~55%) (namely, the output power ratio standard 50% (or 45%~55%) has the optimal power conversion efficiency), and there are 10 power-supplying apparatuses 102, then when all of the power-supplying apparatuses 102 boot for the first time to enter the booting interval, the power detector 106 detects the summation of the actual power consumptions of the electronic apparatuses 104. For example, the summation of the actual power consumptions is 10000 watts. At this time, each of the power-supplying apparatuses 102 will be responsible for outputting 1000 watts (10000/10=1000) computationally, so that the output power ratio is 66.67% (1000/1500 is about equal to 66.67%), which is greater than the output power ratio standard 50% (or 45%~55%). Then, firstly the controller 108 sets the power capping of the power-supplying apparatuses 102 to be 12000 watts (assuming the power capping is set to be 1.2 times of the summation of the actual power consumptions of the electronic apparatuses 104). Secondly the controller 108 calculates to know that 10 of the electronic apparatuses 104 have to be turned on (1500*50%=750, 10000/750 is about equal to 13.33, which exceeds 10, so all 10 of the electronic apparatuses 104 are selected to be turned on). Turning on 10 of the electronic apparatuses 104 will obtain that the summation of the maximal output powers is 15000 watts (1500*10=15000). Then the power-supplying apparatuses 102 enter the working interval. Or, the power detector 106 continues to detect the summation of the actual power consumptions of the electronic apparatuses 104, and the controller 108 continues to calculate the output power ratio of the power-supplying apparatus 102 in the working status, until the output power ratio of the power-supplying apparatus 102 in the working status is less than the output power ratio standard (50%, or 45%~55%), in order to enter the step S06 mentioned above.

After the power-supplying apparatuses 102 finish the booting interval, the power-supplying apparatuses 102 enter the working interval. When the power-supplying apparatuses 102 are in the working interval, the summation of the actual power consumptions of the electronic apparatuses 104 will be changed continually (for example, some of the electronic apparatuses 104 will be turned on, be turned off, be heavy-load, or be light-load), so that the power detector 106 continues to detect the output power of the power-supplying apparatus 102 and the summation of the actual power consumptions of the electronic apparatuses 104, and the controller 108 continues to calculate the output power ratio of the power-supplying apparatus 102 in the working status, and the controller 108 continues to compare the output power ratio of the power-supplying apparatus 102 with the output power ratio standard of the power-supplying apparatus 102.

When the power-supplying apparatuses 102 are in the working interval, if the output power ratio of the power-supplying apparatus 102 in the working status is less than the output power ratio standard (compared by the controller 108), at least one of the power-supplying apparatuses 102 in the working status is turned off by the controller 108, so that the output power ratio of the power-supplying apparatus 102 in the working status increases and meets the output power ratio standard. When the power-supplying apparatuses 102 are in the working interval, if the output power ratio of the power-supplying apparatus 102 in the working status meets the output power ratio standard (compared by the controller 108), the power capping of the power-supplying apparatuses 102 is set by the controller 108 based on the actual power consumption of the electronic apparatus 104.

For example, assuming that the maximal output power of the power-supplying apparatus 102 is 1500 watts, the output power ratio standard is set to be 50% (or 45%~55%) (namely, the output power ratio standard 50% (or 45%~55%) has the optimal power conversion efficiency), and there are 10 power-supplying apparatuses 102, then when the power-supplying apparatuses 102 are in the working interval, the power detector 106 detects the summation of the actual power consumptions of the electronic apparatuses 104. For example, the summation of the actual power consumptions is 4500 watts, and 7 of the power-supplying apparatuses 102 are in the working status. At this time, each of the power-supplying apparatuses 102 will be responsible for outputting 642.86 watts (4500/7 is about equal to 642.86) computationally, so that the output power ratio is 42.86% (642.86/1500 is about equal to 42.86%), which is less than the output power ratio standard 50% (or 45%~55%). Then the controller 108 calculates to know that turning on only 6 (1500*50%=750, 4500/750=6) of the power-supplying apparatuses 102 can meet the output power ratio standard (namely, turn off one of the 7 power-supplying apparatuses 102 originally in the working status). Turning on 6 of the electronic apparatuses 104 will obtain that the summation of the maximal output powers is 9000 watts (1500*6=9000). Then, the controller 108 sets the power capping of the power-supplying apparatuses 102 to be 5400 watts (assuming the power capping is set to be 1.2 times of the summation of the actual power consumptions of the electronic apparatuses 104). At this time, each of the power-supplying apparatuses 102 will be responsible for outputting 750 watts (4500/6=750), so that the output power ratio is 50% (750/1500=50%), which meets the output power ratio standard 50% or 45%~55%. Finally, the power-supplying apparatuses 102 return to the step S14 mentioned above.

When the power-supplying apparatuses 102 are in the working interval, if the output power ratio of the power-supplying apparatus 102 in the working status is greater than the output power ratio standard (compared by the controller 108), and if the controller 108 is aware that at least one of the power-supplying apparatuses 102 is in the rest status, and if the controller 108 calculates to be aware that turning on the power-supplying apparatus in the rest status to cause the output power ratio of the power-supplying apparatus 102 in the working status to meet the output power ratio standard is achievable, then the controller 108 turns on the power-supplying apparatus 108 in the rest status, so that the output power ratio of the power-supplying apparatus 102 in the working status decreases and meets the output power ratio standard.

For example, assuming that the maximal output power of the power-supplying apparatus 102 is 1500 watts, the output power ratio standard is set to be 50% (or 45%~55%) (namely, the output power ratio standard 50% (or 45%~55%) has the optimal power conversion efficiency), and there are 10 power-supplying apparatuses 102, then when the power-supplying apparatuses 102 are in the working interval, the power detector 106 detects the summation of the actual power consumptions of the electronic apparatuses 104. For example, the summation of the actual power consumptions is 6000 watts, and 7 of the power-supplying apparatuses 102 are in the working status (namely, 3 of the power-supplying apparatuses 102 are in the rest status). At this time, each of the power-supplying apparatuses 102 will be responsible for outputting 857.14 watts (6000/7 is about equal to 857.14) computationally, so that the output power ratio is 57.14% (857.14/1500 is about equal to 57.14%), which is greater than the output power ratio standard 50% (or 45%~55%). Then the controller 108 calculates to know that turning on 8 (1500*50%=750, 6000/750=8) of the power-supplying apparatuses 102 can meet the output power ratio standard (namely, the controller 108 has to turn on one of the 3 power-supplying apparatuses 102 originally in the rest status). At this time, each of the power-supplying apparatuses 102 will be responsible for outputting 750 watts (6000/8=750), so that the output power ratio is 50% (750/1500=50%), which meets the output power ratio standard 50% or 45%~55%. Turning on 8 of the electronic apparatuses 104 will obtain that the summation of the maximal output powers is 12000 watts (1500*8=12000). Then, the controller 108 sets the power capping of the power-supplying apparatuses 102 to be 7200 watts (assuming the power capping is set to be 1.2 times of the summation of the actual power consumptions of the electronic apparatuses 104). Finally, the power-supplying apparatuses 102 return to the step S14 mentioned above.

When the power-supplying apparatuses 102 are in the working interval, if the output power ratio of the power-supplying apparatus 102 in the working status is greater than the output power ratio standard (compared by the controller 108), and if the controller 108 is aware that at least one of the power-supplying apparatuses 102 is in the rest status, and if the controller 108 calculates to be aware that turning on the power-supplying apparatus 102 in the rest status to cause the output power ratio of the power-supplying apparatus 102 in the working status to meet the output power ratio standard is unachievable (namely, cannot achieve, meet or very close anyhow), all of the power-supplying apparatuses 102 are turned on, so that the output power ratio of the power-supplying apparatus 102 in the working status decreases, and the power capping of the power-supplying apparatuses 102 is set by the controller 108 based on the actual power consumption of the electronic apparatus 104.

For example, assuming that the maximal output power of the power-supplying apparatus 102 is 1500 watts, the output power ratio standard is set to be 50% (or 45%~55%) (namely, the output power ratio standard 50% (or 45%~55%) has the optimal power conversion efficiency), and there are 10 power-supplying apparatuses 102, then when the power-supplying apparatuses 102 are in the working interval, the power detector 106 detects the summation of the actual power consumptions of the electronic apparatuses 104. For example, the summation of the actual power consumptions is 10000 watts, and 7 of the power-supplying apparatuses 102 are in the working status (namely, 3 of the power-supplying apparatuses 102 are in the rest status). At this time, each of the power-supplying apparatuses 102 will be responsible for outputting 1428.57 watts (10000/7 is about equal to 1428.57) computationally, so that the output power ratio is 95.23% (1428.57/1500 is about equal to 57.14%), which is greater than the output power ratio standard 50% (or 45%~55%). Then the controller 108 calculates to know that 10 of the power-supplying apparatuses 102 have to be turned on (1500*50%=750, 10000/750 is about equal to 13.33, which exceeds 10, so that all of the power-supplying apparatuses 102 have to be turned on). Each of the power-supplying apparatuses 102 will be responsible for outputting 1000 watts (10000/10=1000), so that the output power ratio is 66.67% (1000/1500 is about equal to 66.67%), which is lower than the original 95.23%. Turning on 10 of the electronic apparatuses 104 will obtain that the summation of the maximal output powers is 15000 watts (1500*10=15000). Then, the controller 108 sets the power capping of the power-supplying apparatuses 102 to be 12000 watts (assuming the power capping is set to be 1.2 times of the summation of the actual power consumptions of the electronic apparatuses 104). Finally, the power-supplying apparatuses 102 return to the step S14 mentioned above.

When the power-supplying apparatuses 102 are in the working interval, if the output power ratio of the power-supplying apparatus 102 in the working status is greater than the output power ratio standard (compared by the controller 108), and if the controller 108 is aware that all of the power-supplying apparatuses 102 are in the working status, the power capping of the power-supplying apparatuses 102 is set by the controller 108 based on the actual power consumption of the electronic apparatus 104.

For example, assuming that the maximal output power of the power-supplying apparatus 102 is 1500 watts, the output power ratio standard is set to be 50% (or 45%~55%) (namely, the output power ratio standard 50% (or 45%~55%) has the optimal power conversion efficiency), and there are 10 power-supplying apparatuses 102, then when the power-supplying apparatuses 102 are in the working interval, the power detector 106 detects the summation of the actual power consumptions of the electronic apparatuses 104. For example, the summation of the actual power consumptions is 10000 watts, and 10 of the power-supplying apparatuses 102 are in the working status (namely, all of the power-supplying apparatuses 102 are in the working status). At this time, each of the power-supplying apparatuses 102 will be responsible for outputting 1000 watts (10000/10=1000) computationally, so that the output power ratio is 66.67% (1000/1500 is about equal to 66.67%), which is greater than the output power ratio standard 50% (or 45%~55%). Then the controller 108 sets the power capping of the power-supplying apparatuses 102 to be 12000 watts (assuming the power capping is set to be 1.2 times of the summation of the actual power consumptions of the electronic apparatuses 104). Finally, the power-supplying apparatuses 102 return to the step S14 mentioned above.

From the examples mentioned above, the present invention determines a turned-on quantity of the power-supplying apparatuses 102 base on the maximal output power of the power-supplying apparatus 102, the output power ratio standard of the power-supplying apparatus 102, and the summation of the actual power consumptions of the electronic apparatuses 104. Namely, a computed result=the summation of the actual power consumptions of the electronic apparatuses 104/(the maximal output power of the power-supplying apparatus 102*the output power ratio standard of the power-supplying apparatus 102), wherein the turned-on quantity of the power-supplying apparatuses 102 is equal to the computed result unconditionally carried to an integer, and if the computed result is greater than an actual quantity of the power-supplying apparatuses 102, the turned-on quantity of the power-supplying apparatuses 102 is equal to the actual quantity of the power-supplying apparatuses 102.

The output power ratio standard is, for example but not limited to, 50%, or between 45% and 55%. When the output power ratio standard is 50%, the output power ratio meeting the output power ratio standard mentioned above means that the output power ratio is equal to the output power ratio standard 50%. When the output power ratio standard is between 45% and 55%, the output power ratio being less than the output power ratio standard mentioned above means that the output power ratio is less than a lower limit of the output power ratio standard, namely less than 45%; the output power ratio meeting the output power ratio standard mentioned above means that the output power ratio is between 45% and 55%; the output power ratio being greater than the output power ratio standard mentioned above means that the output power ratio is greater than an upper limit of the output power ratio standard, namely greater than 55%.

If at least one of the power-supplying apparatuses 102 is in the working status and at least one of the power-supplying apparatuses 102 is in the rest status, the power-supplying apparatuses 102 rest by turns to extend a service life of the power-supplying apparatus 102.

The advantage of the present invention is to control the power-supplying apparatus 102 in the working status to work with the output power ratio having the optimal power conversion efficiency to decrease inefficient power consumption to save energy. For example, the present invention utilizes software to monitor the output power ratio of the power-supplying apparatus 102 at any time to dynamically control the power-supplying apparatuses 102 (namely, turn on or off the power-supplying apparatuses 102) to maintain the output power ratio to be the output power ratio (in the examples mentioned above, 50%, or between 45% and 55%) having the optimal power conversion efficiency.

No matter the summation of the actual power consumptions of the electronic apparatuses 104 are light-load, half-load or heavy-load, the present invention endeavors to maintain the output power ratio to be the output power ratio having the optimal power conversion efficiency. The present invention dynamically adjusts the power capping of the power-supplying apparatuses 102 based on the summation of the actual power consumptions of the electronic apparatuses 104. The present invention utilizes software to calculate whether the power capping is enough at any time to avoid the problem of the power-off system because the output powers of the power-supplying apparatuses 102 are not enough when one or more node hosts boot.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power-outputting management method applied to a plurality of power-supplying apparatuses and at least one electronic apparatus, the plurality of power-supplying apparatuses configured to supply power to the electronic apparatus, the power-outputting management method comprising:
   turning off at least one of the plurality of power-supplying apparatuses in a working status to increase output power ratios of the plurality of power-supplying apparatuses in the working status to meet an output power ratio standard if the plurality of power-supplying apparatuses are in a working interval and the output power ratios of the plurality of power-supplying apparatuses in the working status are less than the output power ratio standard; and
   setting a power capping of the plurality of power-supplying apparatuses based on an actual power consumption of the electronic apparatus if the plurality of power-supplying apparatuses are in the working interval and the output power ratios of the plurality of power-supplying apparatuses in the working status meet the output power ratio standard, wherein the output power ratio of each of the plurality of power-supply apparatuses is achieved by dividing an actual output power of each the plurality of power-supply apparatuses over an maximum output power of each of the plurality of power-supply apparatuses.

2. The power-outputting management method in claim 1, wherein the output power ratio standard is 50%, or is between 45% and 55%.

3. The power-outputting management method in claim 2 further comprising:
   turning on at least one of the plurality of power-supplying apparatuses in a rest status to decrease the output power ratios of the plurality of power-supplying apparatuses in the working status to meet the output power ratio standard if the plurality of power-supplying apparatuses are in the working interval, the output power ratios of the plurality of power-supplying apparatuses in the working status are greater than the output power ratio standard, the at least one of the plurality of power-supplying apparatuses is in the rest status and turning on the at least one of the plurality of power-supplying apparatuses in the rest status to cause the output power ratios of the plurality of power-supplying apparatuses in the working status to meet the output power ratio standard is achievable.

4. The power-outputting management method in claim 3 further comprising: turning on all of the plurality of power-supplying apparatuses to decrease the output power ratios of the plurality of power-supplying apparatuses in the working status and setting the power capping of the plurality of power-supplying apparatuses based on the actual power consumption of the electronic apparatus if the plurality of power-supplying apparatuses are in the working interval, the output power ratios of the plurality of power-supplying apparatuses in the working status are greater than the output power ratio standard, the at least one of the plurality of power-supplying apparatuses is in the rest status, and turning on the at least one of the plurality of power-supplying apparatuses in the rest status to cause the output power ratios of the plurality of power-supplying apparatuses in the working status to meet the output power ratio standard is unachievable.

5. The power-outputting management method in claim 4 further comprising:
   setting the power capping of the plurality of power-supplying apparatuses based on the actual power consumption of the electronic apparatus if the plurality of power-supplying apparatuses are in the working interval, the output power ratios of the plurality of power-supplying apparatuses in the working status are greater than the output power ratio standard and all of the plurality of power-supplying apparatuses are in the working status.

6. The power-outputting management method in claim 5 further comprising:
   firstly setting the power capping of the plurality of power-supplying apparatuses based on the actual power consumption of the electronic apparatus, secondly turning off the at least one of the plurality of power-supplying apparatuses in the working status to increase the output power ratios of the plurality of power-supplying apparatuses in the working status to meet the output power ratio standard, and then the plurality of power-supplying apparatuses entering the working interval, if all of the plurality of power-supplying apparatuses boot for a first time to enter a booting interval and the output power ratios of the plurality of power-supplying apparatuses in the working status are less than the output power ratio standard.

7. The power-outputting management method in claim 6 further comprising:
   firstly setting the power capping of the plurality of power-supplying apparatuses based on the actual power consumption of the electronic apparatus, and secondly the plurality of power-supplying apparatuses entering the working interval, if all of the plurality of power-supplying apparatuses boot for the first time to enter the booting interval and the output power ratios of the plurality of power-supplying apparatuses in the working status are greater than or meet the output power ratio standard.

8. The power-outputting management method in claim 7, wherein the power capping of the plurality of power-supplying apparatuses is set to be greater than the actual power consumption of the electronic apparatus.

9. The power-outputting management method in claim 8, wherein the power capping of the plurality of power-supplying apparatuses is set to be 1.2 times of the actual power consumption of the electronic apparatus.

10. The power-outputting management method in claim 9, wherein the plurality of power-supplying apparatuses are configured to rest by turns to extend a service life if the at least one of the plurality of power-supplying apparatuses is in the working status and the at least one of the plurality of power-supplying apparatuses is in the rest status.

* * * * *